United States Patent [19]

Kabat

[11] 3,852,606

[45] Dec. 3, 1974

[54] FLAME DETECTION SYSTEM UTILIZING A RADIATION COUPLING

[75] Inventor: John L. Kabat, Bloomington, Minn.

[73] Assignee: Honeywell, Inc., Minneapolis, Minn.

[22] Filed: Oct. 12, 1973

[21] Appl. No.: 406,078

[52] U.S. Cl. .......... 250/551

[51] Int. Cl. .......... G02f 1/28

[58] Field of Search ....... 250/551; 431/24; 317/123, 317/148; 307/311; 356/217

[56] References Cited

UNITED STATES PATENTS

| | | | |
|---|---|---|---|
| 2,304,641 | 12/1942 | Jones | 431/24 |
| 3,569,793 | 3/1971 | Pinckaers | 317/148 |
| 3,803,419 | 4/1974 | Obenhaus | 250/551 |

*Primary Examiner*—Archie R. Borchelt
*Assistant Examiner*—Davis L. Willis
*Attorney, Agent, or Firm*—Alfred N. Feldman

[57] ABSTRACT

A substantially fail-safe system for detection of flames, particularly flames in a fuel burner. A flame sensing means and amplifier that is responsive to the flicker frequency of a burning flame is coupled by a fail-safe type of circuit to a second safety type of amplifier. The second safety type of amplifier is a cyclic type of amplifier that requires a continuously cycling input signal in order for it to have an output indicating the existence of a flame at the flame sensing means. The fail-safe coupling between the two amplifiers is a radiation emitting device and a radiation responsive device that are electrically isolated, and which are so selected and arranged that the system becomes inoperative upon a number of different types of failures.

10 Claims, 1 Drawing Figure

PATENTED DEC 3 1974
3,852,606
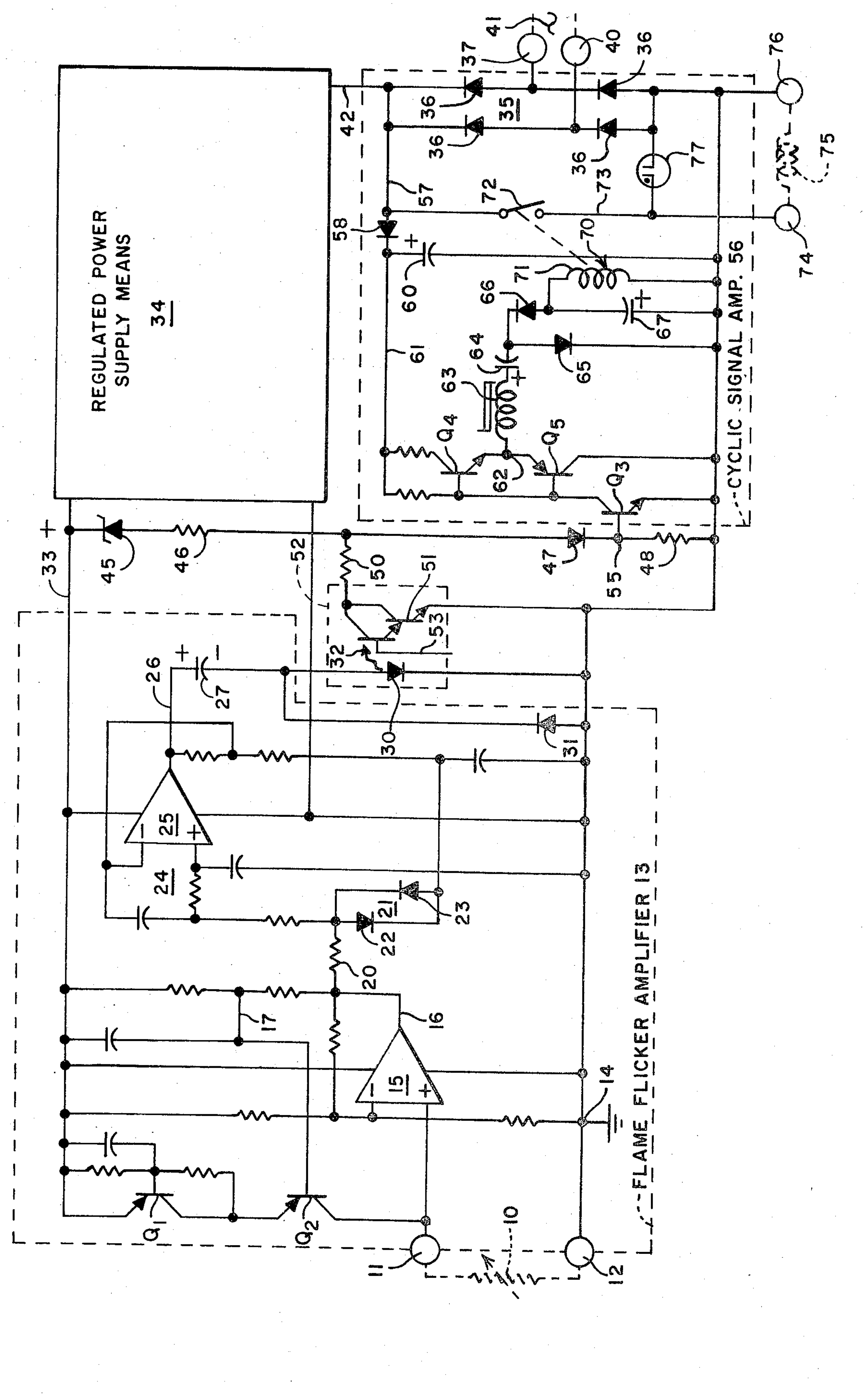

FLAME DETECTION SYSTEM UTILIZING A RADIATION COUPLING

BACKGROUND OF THE INVENTION

In infrared flame detection systems, a sensing element and a flame flicker amplifier are normally provided. The flicker frequency of a burning flame is selectively amplified and the output of the amplifier is integrated to obtain a signal which is indicative of the existence of a properly burning flame. These types of systems are well known, and are exemplified by a system such as disclosed in U.S. Pat. No. 2,304,641 issued on Dec. 8, 1942 to Jones, or disclosed in a more recent and sophisticated form in the U.S. patent application Ser. No. 351,740, filed on Apr. 16, 1973 in the name of M. E. Larson. The Jones patent discloses an early type of vacuum tube flicker frequency infrared flame detection system. The Larson application discloses a more sophisticated solid state flame flicker amplifier that has a variable impedance in series with the flame sensing photocell so that the voltage across the photocell can be compensated to adjust for variations in background radiation, and for variations from cell to cell so that the selection of the particular photocell is not critical.

The flame flicker amplifiers of the types generally in use have the potential hazard of inadvertently allowing an oscillation to exist which simulates the existence of flame. This type of oscillation can occur either due to voltage transients or due to component failures in the device.

SUMMARY OF THE INVENTION

The present invention is directed to a unique coupling arrangement between a flame flicker amplifier of the type disclosed in the previously mentioned Larson patent application, and a cyclic signal amplifier which is responsive only to a continuously cycling input signal. The cyclic signal amplifier, as disclosed in the present application, is of a type completely disclosed and described in U.S. Pat. No. 3,569,793 issued on Mar. 9, 1971 to B. H. Pinckaers. The cyclic signal amplifier is one that requires a continuously cycling input signal in a particular frequency range in order for the amplifier to have a useful output. A cyclic signal of a higher frequency is blocked, and the failure of a signal to cycle either in turning the amplifier "on" or "off" is effectively sensed and the amplifier indicates this failure by dropping out a relay contact. In the present invention, the output relay of the cyclic signal amplifier must be energized for the associated fuel burner control system to be energized to admit fuel to the burner.

Since it is possible for a flame flicker amplifier to provide the necessary cyclic input to a cyclic signal amplifier, it would initially seem unnecessary to provide any special type of coupling. This, however, is not necessarily the case as the flame flicker amplifiers have been known to have oscillating types of failures due to a component failure or to a change in the voltage supplied to the amplifier. The present invention utilizes a radiation emitting means and a radiation responsive means that can provide an isolated coupling between a flame flicker amplifier and cyclic signal amplifier when the power being supplied is within a predetermined voltage range. This protects against failures in the power supply and other parts of the system. The radiation coupling also eliminates any possibility of an electrical failure directly coupling the flame flicker amplifier to the cyclic signal amplifier.

BRIEF DESCRIPTION OF THE DRAWING

The single FIGURE of the present application discloses in a detail a flame flicker amplifier, an isolating coupling, a power supply, and a cyclic signal amplifier to utilize the coupling for safe operation of a load, such as a fuel burner energizing relay or valve.

DESCRIPTION OF THE PREFERRED EMBODIMENT

A photocell means 10, such as a lead sulfide cell, is connected across terminals 11 and 12 of a flame flicker amplifier means 13. The flame flicker amplifier means 13 encompasses the electronic network enclosed in the noted dashed block and, is an amplifier which responds to the resistance variations of the photocell means 10, as it in turn is exposed to a flame. As the flame flickers, the resistance of the photocell means 10 varies at the flicker frequency. The flame flicker amplifier means 13 can be of any conventional design, but in the present disclosure has been detailed in the form disclosed in the Larson application previously mentioned. Amplifier means 13 will be described in its general makeup without a detailed explanation of all of the circuit components, in view of the complete disclosure contained in the Larson application, and in view of the fact that a more conventional flame flicker amplifier means 13 could be used.

The terminal 12 is grounded at 14 to a common ground for the electronic network of the present invention. Terminal 11 is connected to an amplifier generally disclosed at 15. The output of the amplifier 15 is on conductor 16. A feedback voltage path on conductor 17 is provided so that a direct current feedback can be provided to an electronic network including transistors Q1 and Q2. The transistors Q1 and Q2, along with their associated resistors and capacitors, make up a variable impedance which is controlled by the direct current feedback voltage on conductor 17. The variable impedance is used to adjust the voltage supplied to the photocell means 10 so that the voltage across the photocell means 10 is not affected particularly by the variations from one cell to another when the cells are replaced, nor is the voltage particularly affected by background radiation associated with the burner.

The output of the amplifier 15 on conductor 16 is also fed through a resistor 20 to a clipper generally disclosed at 21 and made up of a pair of diodes 22 and 23. The clipper 21 limits the input to a further network 24 and an amplifier 25. Network 24 and amplifier 25 make up a band pass amplifier having an output on conductor 26 and which output has a varying voltage at the flame flicker frequency. The output on conductor 26 is fed to a flicker frequency coupling means 27, disclosed as a capacitor, and is connected to a radiation emitting means 30, that is disclosed as a light emitting diode. The light emitting diode 30 is paralleled by a reverse diode 31. Current flows through the light emitting diode 30 from the capacitor 27 with each voltage swing on the conductor 26, at the frequency of the flickering flame.

At this point, it is well to note that the only requirements of the input circuitry is that the photocell means 10 have an appropriate flame flicker amplifier means 13 that has an output on a conductor 26 to a flicker frequency coupling means 27 that would normally be a capacitor. This frequency is passed through capacitor 27 to provide a flickering light 32 at the light emitting diode 30. The flickering light 32 is used as a coupling, in a manner that will be described in connection with the balance of the circuitry.

The flame flicker amplifier means 13 is energized by a direct current voltage on conductor 33, and is derived from a regulated power supply means 34 that forms part of a larger power supply means. The larger power supply means includes a full wave bridge 35 that has four diodes 36 with appropriate connections to two terminals 37 and 40, which are adapted to be connected to a conventional source of alternating current 41. An unfiltered direct current output is provided between the ground 14 and the conductor 42. The regulated power supply means 34 is provided with the necessary energy so that the regulated voltage at conductor 33 is available for the flame flicker amplifier means 13, and for a network that will be described in connection with the novel coupling means used in the present invention.

The novel coupling means of the present invention is made up of a voltage divider means including a Zener diode 45, a resistor 46, a conventional diode 47, and a resistor 48. The voltage divider means of 45, 46, 47, and 48 connect from the conductor 33 to the ground 14. Operated in parallel with the diode 47 and the resistor 48 is a current shunting arrangement including a resistor 50 and a photo Darlington transistor circuit that forms a radiation responsive impedance means 51. The radiation responsive impedance means 51 and the light emitting diode 30 are enclosed in a package 52 so that the light emitting diode 30 is the only radiation emitting means that affects the radiation responsive means 51. The radiation responsive means 51 has been disclosed as a light responsive Darlington transistor configuration with a base conductor 53 left unconnected. This is permissible as the radiation provides the necessary electron drive for the base circuit. The conductor 53 could be connected through a resistor to ground, if desired.

The light emitting diode 30 and the photo Darlington 51 enclosed in the package 52 are a commercially available item, and could be replaced by any type of radiation emitting means such as a light bulb, and a radiation responsive means such as a photo responsive resistor. The voltage divider means made up of the Zener diode 45, resistor 46, diode 47, resistor 48, and the shunt network resistor 50 and Darlington 51 forms a rather unique coupling arrangement that will be described after the balance of the electronics circuitry has been disclosed.

A junction 55 between the diode 47 and resistor 48 is connected to a transistor Q3 that forms an input circuit for a cyclic signal amplifier means 56 of a type disclosed in the U.S. Pat. No. 3,569,793, previously mentioned. The cyclic signal amplifier means 56 has the unique property of being responsive only to a continuously varying or cyclic signal in a predetermined frequency range. The cyclic signal amplifier means 56 is supplied with power on conductor 57 to a diode 58 and a filter capacitor 60 from the bridge 35. The filtered voltage on conductor 61 is supplied to a first transistor Q4 and then to a second transistor Q5 to ground 14. A junction 62 between these two transistors is connected through an inductor 63 that is designed to block all frequencies above a predetermined level, thereby eliminating the possibility of a line voltage frequency passing through this specially designed cyclic signal amplifier means 56. The inductor 63 is connected to a capacitor 64 that in turn is connected to a diode 65 and then to ground. The diode 65 is paralleled by a reverse diode 66 and a further capacitor 67. The further capacitor 67 is paralleled by an output type of relay or switching means 70, having a coil 71 and an accompanying switch 72. When the switch 72 is closed, power is supplied from the conductor 57 to the conductor 73 and to a terminal 74 which is adapted to be connected across a relay or gas valve 75 to a further terminal 76 that is connected to ground. The realay or gas valve 75 is paralleled by a gas break-down tube 77 which could be a free wheeling type of diode. The tube 77 provides a function similar to a free wheeling diode in discharging any collapsing field of the inductive load 75 when the load is de-energized.

The cyclic signal amplifier means 56 relies on a varying current drive at junction 55 to periodically drive the transistor Q3 into conduction. With Q3 "off," Q4 will conduct as its base is near the voltage on conductor 61. The conduction of transistor Q4 charges the capacitor 64 through the diode 65 to ground thereby providing a charge across the capacitor 64 with a polarity as marked. When the base drive at junction 55 causes the transistor Q3 to conduct, the transistor Q5 also conducts and the capacitor 64 is allowed to discharge through the inductor 63 and the transistor Q5 to charge the capacitor 67. As long as alternating turn "on" and turn "off" signals are provided to transistor Q3, the capacitor 64 is periodically charged to some level and then discharged to transfer this charge to the capacitor 67. This continuous transfer of charge is required to build up a charge on capacitor 67, and to maintain the charge on capacitor 67 to energize the output means 70. At any time that the transistor Q3 is driven continuously into conduction, or is driven out of conduction continuously, the alternating charging and discharging of the capacitor 64 ceases and this causes the voltage across the capacitor 67 to disappear thereby de-energizing the output means 70 and opening the switch 72. It can thus be seen that a continuously alternating signal must be supplied at the junction 55 in order to keep the contact 72 closed to energize the ultimate output load means 75.

In order to provide the continuously cyclic signal required by the cyclic signal amplifier means 56, the coupling network previously described has been designed so that the light emitting diode 30 receives a voltage through the capacitor 27 of a frequency similar to the flame flicker sensed by the photocell means 10. As long as the coupling capacitor 27 provides the light emitting diode 30 with a varying voltage, a flickering radiation 32 is provided. This radiation in turn continuously causes the radiation responsive impedance means or Darlington transistor 51 to conduct at the same frequency as the flickering radiation. Each time the Darlington transistor 51 conducts, current is shunted around through the resistor 50 and the Darlington 51 to ground. This diverts the current that would flow in the voltage divider network made up of the Zener diode 45, the resistor 46, the diode 47, and resistor 48. Each time the Darlington transistor 51 conducts, the drive current for transistor Q3 is diverted to ground and the transistor Q3 is turned "off." As the light emitting diode 30 becomes dark, the Darlington transistor 51 ceases to conduct and the full current flow in the voltage divider means is provided through the diode 47 and resistor 48 so that the transistor Q3 is driven into conduction. As a result of this arrangement, transistor Q3 turns "on" and "off" at the same frequency as the flickering light or radiation from a light emitting diode 30. By properly selecting the values of the components in the voltage divider network, substantially all of the current flowing through the Zener diode 45 and resistor 46 is diverted to ground each time the photo Darlington 51 conducts. With this unique arrangement there is complete electrical isolation between the flame flicker amplifier means 13 and the cyclic signal amplifier means 56 even though the two circuits are functionally coupled together.

Two more important failure modes are further protected against by the use of the present coupling means. The voltage on conductor 33, from the regulated power supply means 34, can suddenly rise substantially in the event of a failure of a component in the regulated power supply means 34. If the voltage on conductor 33 rises substantially above the design level, the current being drawn through the voltage divider means made up of the Zener diode 45, resistor 46, diode 47 and resistor 48 rises substantially, also. The resistor 50 limits the current flow through the photo Darlington 51 to such a level that the photo Darlington 51 is incapable of draining to ground all of the current in the voltage divider means, and a continuous supply of current is thus available to the diode 47 and resistor 48 providing a continuous "on" signal for transistor Q3. It thus becomes apparent that when Q3 is driven to a continuous "on" condition, that the cyclic signal amplifier means 56 responds by ceasing its cyclic operation which is required to transfer energy from a capacitor 64 to the capacitor 67 to keep the output means 70 energized. Therefore, if transistor Q3 is driven into continuous conduction by a rise in the voltage on conductor 33, the relay or output means 70 becomes de-energized and the switch 72 opens thereby disabling the fuel burner control system.

Another component failure mode which is protected against by the present arrangement is an open circuit of the Zener diode 45 or a drop in the regulated voltage 33 below a predetermined level. In the event of the drop of the voltage in the voltage divider network, the transistor Q3 is driven out of conduction continuously and since the system has been designed to respond to cyclic signal, the switch 72 again would open thereby protecting the fuel burner control system.

With the present coupling arrangement utilizing the light emitting diode 30 and the photo Darlington 51, electrical isolation has been provided between the input amplifier circuits and the output circuit. This arrangement further protects against either a sudden rise in the regulated power supply means due to a component failure, or the loss of this particular voltage. The addition of the coupling circuit and the cyclic signal amplifier means 56 to a conventional flame flicker amplifier means 13 provides an unusually safe flame flicker type of system that has not been available before. The present system discloses one preferred embodiment wherein a voltage divider means including a radiation responsive impedance means is provided between the input amplifier and an output safety circuit to provide a fuel burner control system with a high degree of reliability. The present concept could be applied to a number of different specific circuits, and the applicant therefore wishes to be limited in the scope of his invention solely by the scope of the appended claims.

The embodiments of the invention in which an exclusive property or right is claimed are defined as follows:

1. A fuel burner control system which is adapted to respond to the resistance variations of photocell means exposed to a flame in a fuel burner, including: power supply means having voltage output means; flame flicker amplifier means energized from said voltage output means and having an input adapted to be connected to said photocell means with said amplifier means being capable of amplifying said resistance variations which are representative of the presence of flame; said amplifier means including output circuit means having flicker frequency coupling means and radiation emitting means which emits a flickering radiation when said flame is sensed; voltage divider means including radiation responsive impedance means connected to said voltage output means; said radiation responsive impedance means varying in impedance in response to said radiation of said radiation emitting means; cyclic signal amplifier means having input means connected to said voltage divider means to respond to variations in current flow in said voltage divider means as said radiation responsive impedance means varying with said flickering radiation from said radiation emitting means; and said cyclic signal amplifier means having output means which is energized only in response to the presence of said flame as represented by said flickering radiation from said radiation emitting means.

2. A fuel burner control system as described in claim 1 wherein said flame flicker amplifier means is responsive to an infrared flame flicker frequency created by said flame.

3. A fuel burner control system as described in claim 1 wherein said flicker frequency coupling means is a capacitor.

4. A fuel burner control system as described in claim 3 wherein said radiation emitting means is light emitting semiconductor means and said radiation responsive impedance means is light responsive semiconductor means.

5. A fuel burner control system as described in claim 1 wherein said voltage divider means including said radiation responsive impedance means is so selected and arranged that said cyclic signal amplifier input means can receive a varying current flow within an operating range of said cyclic signal amplifier means only when said voltage divider means has a predetermined voltage range.

6. A fuel burner control system as described in claim 5 wherein said flicker frequency coupling means is a capacitor.

7. A fuel burner control system is described in claim 6 wherein said radiation emitting means is light emitting semiconductor means and said radiation responsive impedance means is light responsive semiconductor means.

8. A fuel burner control system as described in claim 7 wherein said voltage divider means includes a Zener diode and said light emitting semiconductor means is a light emitting diode.

9. A fuel burner control system as descirbed in claim 8 wherein said light responsive semiconductor means is connected to cyclically shunt current in said voltage divider means past the input circuit means of said cyclic signal amplifier means in response to said flickering radiation from the light emitting diode when flame is sensed.

10. A fuel burner control system as described in claim 9 wherein said flame flicker amplifier means is responsive to an infrared flame flicker frequency created by said flame.

* * * * *